Patented Mar. 1, 1938

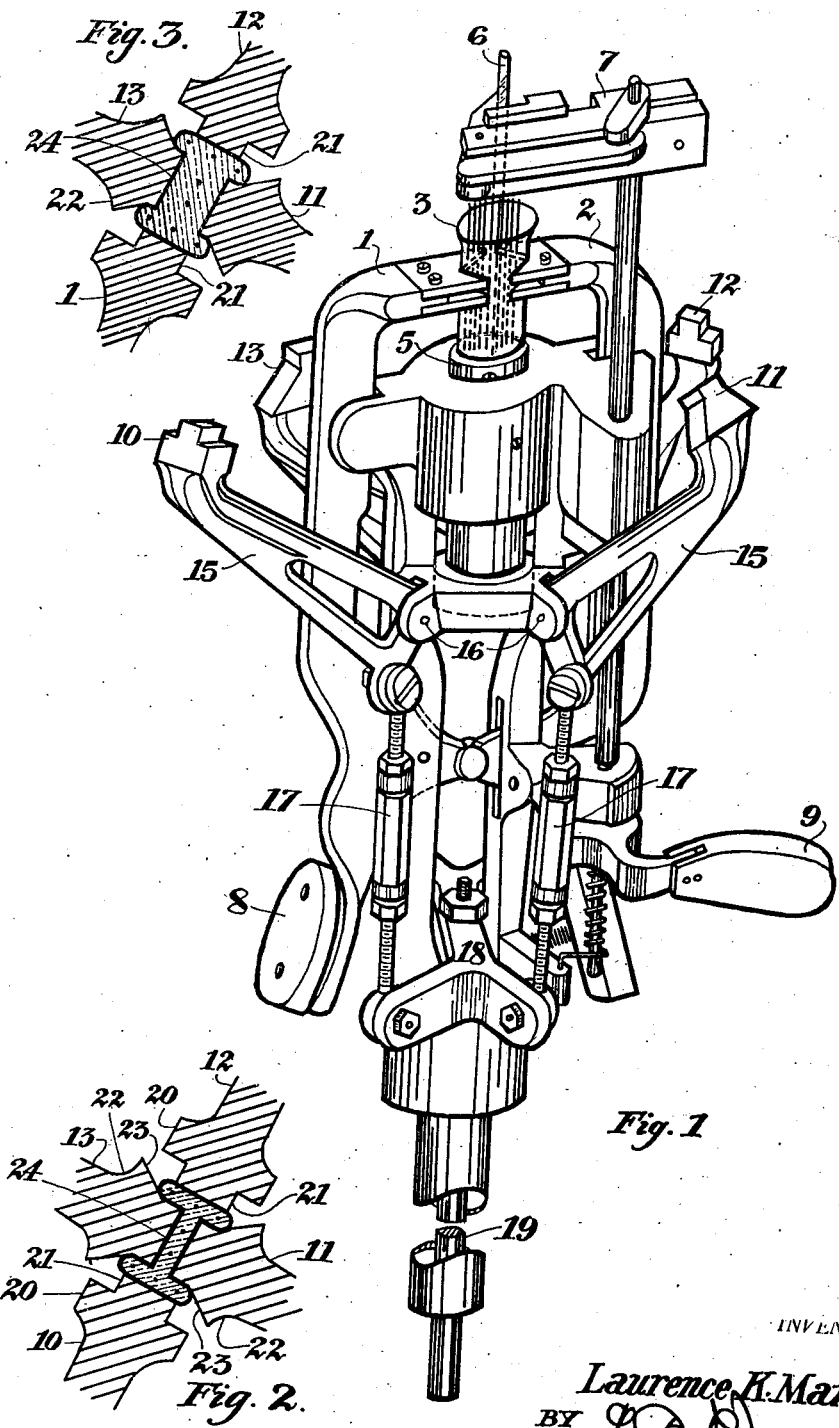

2,109,544

UNITED STATES PATENT OFFICE 2,109,544

SPACE DISCHARGE TUBE STEM MACHINE

Laurence K. Marshall, Cambridge, Mass., assignor, by mesne assignments, to Raytheon Production Corporation, Newton, Mass., a corporation of Delaware Original application October 7, 1929, Serial No. 398,052. Divided and this application September 10, 1934, Serial No. 743,373

9 Claims. (Cl. 49—2)

This invention relates to a method and means for manufacturing stems for vacuum tubes and the like. In the manufacture of vacuum tubes and the like, it is customary to dispose the several wires to be sealed in the glass in a jig and slip a glass tube over them. The tube is then heated to soften the glass and pressed to the desired shape. It is desirable to have a press of such shape as to permit the wires sealed therein to extend upwardly into the tube without bending, while supporting the electrode structure. This has the advantage of eliminating the step of bending the wires with the possibility of resultant defective seals. Furthermore, heavy spring wire may be used which more effectively supports the electrode structure against shock and vibration. The stem of my invention has a plurality of wings or portions extending in more than one vertical plane, the wings, however, not meeting at a common junction. My preferred form is H-shaped. By having a stem of such a shape, wires may be sealed in various corners to form a rigid skeleton frame-work upon which the entire electrode structure of a vacuum tube may be supported.

In order to make tight seals in the stems, it is essential that pressure normal to the surfaces formed be applied. Thus in the case of the well-known flat press, anvils press the glass from opposite sides. Each one forms a reacting block for the other, and pressure on the glass is applied perpendicularly thereto. Presses of complex shape may be manufactured by different methods and with differently shaped anvils. With such a number of possible ways and means, it is clear that the best must include the above fundamentals.

In my method of making the stem, I have four anvils pressed toward each other, each opposite pair being in line. The forward faces of each anvil apply pressure to the soft glass. The faces of two anvils react against each other as in the ordinary flat press method. In addition, the sides of these two anvils form reaction surfaces for the remaining two anvils. In this way, firm pressure normal to the resulting surfaces is applied substantially over the press.

Referring to the drawing, Fig. 1 is a perspective view of a head for making my press;

Fig. 2 is a diagrammatic view showing the anvils pressing a stem; and

Fig. 3 is similar to Fig. 2, except that a modified form of stem is shown.

Referring to the drawing, the head shown in Fig. 1 is of the usual type provided on vacuum tube machines, with the exception that four anvils are provided. The head comprises jaws 1 and 2 which are spring-pressed, and maintain between them a glass tube 3 out of which the press is to be formed. Within the glass tube are a plurality of wires positioned in a jig 5. An exhaust tube 6 is suitably maintained by well-known mechanism generally designated as 7. Handles 8 and 9 are provided for respectively releasing jaws 1 and 2 and mechanism 7. Four anvils 10, 11, 12, and 13 are provided, and are adapted to be actuated by arms 15. These arms are pivoted at 16 to the head proper, and are adapted to be moved by means of adjustable rods 17. These rods are suitably actuated by a spider 18 and push-rod 19 in the usual manner.

As shown in Fig. 2, anvils 10 and 12 have base portions 20 from the forward faces of which project portions 21. Anvils 11 and 13 have base portions 22 provided with sloping sides 23 and terminating in rectangular projecting portions 24. As will be noted in Fig. 1, all anvils are of suitable thickness for forming the press.

In Fig. 3, a modification of Fig. 2 is shown in which the middle portion of the stem is made substantially thicker. This is preferably accomplished by making portions 24' of anvils 11 and 13 of less width than in Fig. 2, resulting in a greater distance between anvils when the press is formed.

It is evident that supporting arbors may be sealed in any desired portions of either one of the stems.

In actual manufacture, it has been found that stems of this type can be made very easily without any unusual number of defective seals. As is well known, in order to have the wires sealed into the glass perfectly, it is necessary that the soft glass be firmly pressed to the wire. It is obvious that from the shape of the anvils the central pinch 31 or 31' will be firmly pressed by portions 24 or 24' of anvils 11 and 13. Furthermore, anvils 10 and 12 press end portions of 32 while pressing the connecting intermediate pinch transversely. Because of the flaring sides 23 of anvils 11 and 13, the end portions of wings 32 are firmly pressed against the corresponding wires to seal them into place.

The presses shown in Figs. 2 and 3, while useful with any electrode structure, are especially useful for supporting the electrode structures shown in the copending applications of Andrew E. Lyle, Serial No. 315,275, filed October 26, 1928, Serial No. 336,243, filed January 30, 1929, Serial No. 381,018, filed July 25, 1929, and the patent to Paul T. Weeks, No. 1,961,269, dated June 5, 1934.

It is evident that the press need not have the two end portions at right angles to the intermediate pinch portion to form an H, but may be at any desired angle. Furthermore, by changing the dimensions of the anvils, any desired size of press having any desired thickness of the various wing portions may be had. If desired, one of the end wing portions 32 may be omitted and a T-shaped press be formed instead. For certain electrode structures, this may be found desirable.

This application is a division of my co-pending application, Serial No. 398,052, filed October 7, 1929.

What is claimed is:

1. A head for forming a press including four anvils, two opposing anvils having flat faces adapted to press against the glass, said two remaining anvils having flat forward faces and flaring sides.

2. In a head for making a press, a plurality of pairs of opposing anvils, said anvils having suitable faces for pressing against the glass, one pair of said anvils adapted to approach nearer to each other than the remaining anvils and to function as supporting means for the portion of the glass adapted to be pressed by said remaining anvils.

3. A stem-making machine comprising means for supporting a plurality of stem wires in a plurality of planes, means for supporting a glass tube from which the stem is to be formed around said wires, a pair of movable anvils for pressing the glass, said anvils being movable in a plane substantially at right angles to one of said first-named planes, a second pair of movable anvils for pressing said glass, said second pair of anvils being movable in a plane substantially at right angles to another of said first-named planes.

4. A stem-making machine comprising means for supporting a plurality of stem wires in a plurality of planes, means for supporting a glass tube from which the stem is to be formed around said wires, a pair of movable anvils for pressing the glass, said anvils being movable in a plane substantially at right angles to one of said first named planes, a second pair of movable anvils for pressing said glass, said second pair of anvils being movable in a plane substantially at right angles to another of said first-named planes, the planes in which said anvils move intersecting substantially at the center of the press to be formed, said anvils being movable in said planes toward said intersection.

5. A stem-making machine comprising means for supporting a plurality of stem wires in a plurality of planes, means for supporting a glass tube from which the stem is to be formed around said wires, a pair of movable anvils for pressing the glass, said anvils being movable in a plane substantially at right angles to one of said first-named planes, the opposed faces of said anvil pair reacting against each other to press the glass between them and form a press in one of said planes, a second pair of movable anvils for pressing said glass, said second pair of anvils being movable in a plane substantially at right angles to another of said first-named planes, the faces of said anvils of said second pair reacting against the sides of the anvils of said first pair to press the glass between said faces and said sides to form additional presses in another of said planes.

6. A stem-making machine comprising means for holding a plurality of wires in substantially the same plane, means for holding a plurality of wires in a plane transverse to said first-mentioned wires, pressing means for forming a seal around said wires, said pressing means comprising a pair of pressing anvils movable in a direction substantially perpendicular to said first-mentioned wires, and a second pressing anvil movable in a direction substantially perpendicular to said second-mentioned wires.

7. A stem-making machine comprising means for holding a plurality of wires in substantially the same plane, means for holding a plurality of wires in a plane transverse to said first-mentioned wires, pressing means for forming a seal around said wires, said pressing means comprising a pair of pressing anvils movable in a direction substantially perpendicular to said first-mentioned wires, and a second pressing anvil movable in a direction substantially perpendicular to said second-mentioned wires at one end of the row of said first-mentioned wires.

8. A stem-making machine comprising means for holding a plurality of wires in substantially the same plane, means for holding a plurality of wires in a plane transverse to said first-mentioned wires, pressing means for forming a seal around said wires, said pressing means comprising a pair of pressing anvils movable in a direction substantially perpendicular to said first-mentioned wires, a second pressing anvil movable in a direction substantially perpendicular to said second-mentioned wires, and means for supporting a tube from which the stem is to be formed around said wires in a position to be engaged by said anvils.

9. A stem-making machine comprising a supporting member, means for holding wires, means for supporting a tube from which the stem is to be formed around said wires, a pair of anvils pivotally mounted on said supporting member, an additional anvil pivotally mounted on said supporting member, and means for bringing said anvils into pressing engagement with said tube, said additional anvil in its pressing position laterally overlying said pair of anvils.

LAURENCE K. MARSHALL.